May 31, 1932. J. M. SCHILTZ 1,860,599
ANIMAL TRAP
Filed Dec. 18, 1930
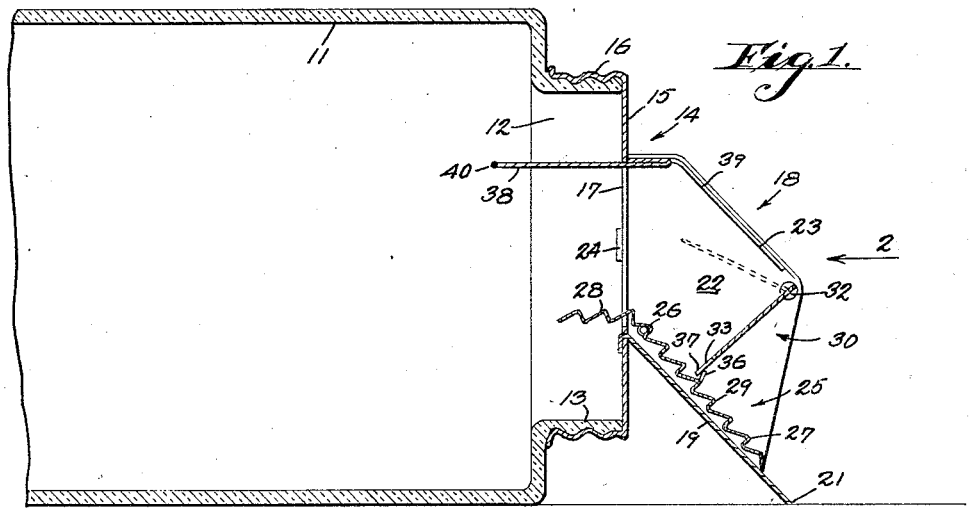
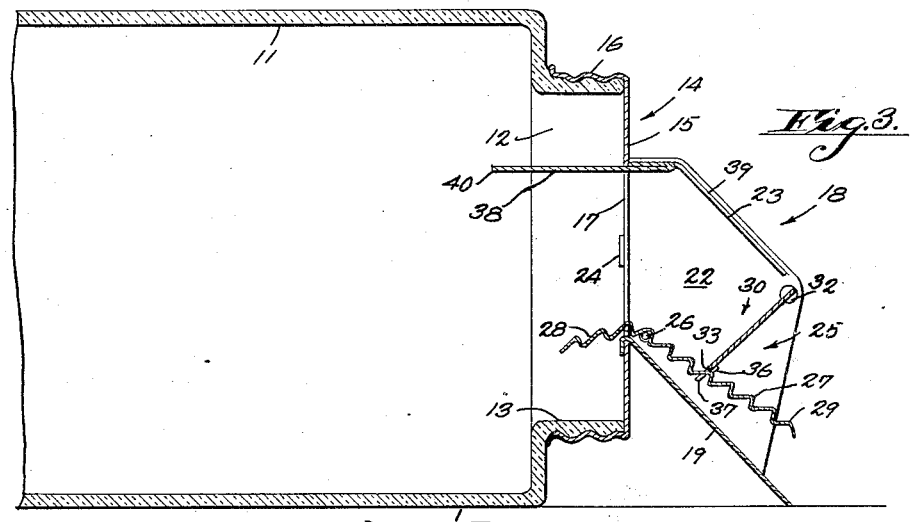
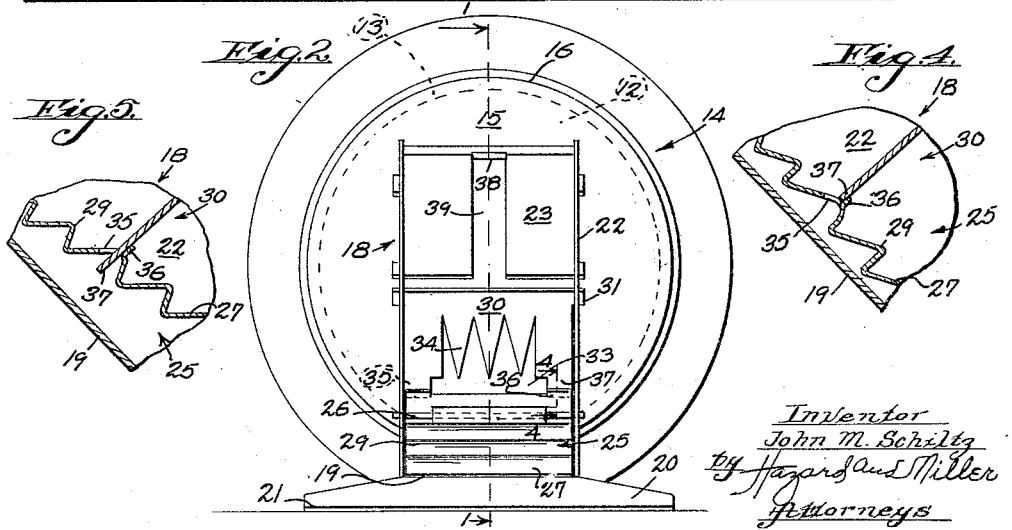
Inventor
John M. Schiltz
by Hazard and Miller
Attorneys Patented May 31, 1932

1,860,599

UNITED STATES PATENT OFFICE

JOHN M. SCHILTZ, OF WICHITA, KANSAS

ANIMAL TRAP

Application filed December 18, 1930. Serial No. 503,206.

My invention relates to an animal trap, particularly a trap designed to trap rodents and other similar small animals.

My invention may be considered, to a certain extent, as employing some of the features of my patent application, Serial Number 298,188, filed August 9, 1928, in which the trap is connected with a glass bottle or the like so that the animal entrapped may be seen through the bottle.

An object of my present invention is having a cap structure which may be secured to the neck of a bottle by screw threading thereon, and this cap structure has the trapping elements secured thereto and positioned on the outside of the cap structure and, hence, on the outside of the bottle.

A further object and feature of my invention is a trapping arrangement having a passage with an upward incline for the rodent to follow, and in this passage having a runway, which, after the animal has advanced partly in the trap, tilts upwardly, thus forming with a gate element a blockade of such passage and preventing movement of a gate which forms a partial bar or closure of the said passage. In this connection another detailed feature of employing the pivotal runway is that such runway is so arranged that when the animal bears some of its weight on the inner end of the runway in attempting an exit, this tilts up and again secures the gate from movement.

A further object of my invention is the employment of a pivotally mounted gate having its pivots in the upper part of the passage on each side thereof, and this gate is provided with a series of prongs or sharp points. The gate is pivoted so that it may be readily lifted by an animal passing up and into the runway into the trap, but the prongs will prevent the animal from backing out, or, if the gate should, for any reason, remain partly open the prongs would catch the animal and prevent its exit. The gate is heavier at the lower portions so that it is normally inclined downwardly and engages against stops or abutments on the pivoted runway, thus preventing the gate from opening outwardly but allowing it to open freely inwardly to allow passage of the rodent.

Another feature of my invention is constructing the runway with a device for attaching the bait secured on a bait holder extending into the container of the trap from the upper part of the runway. Thus the bait may be secured to the bait holder and as the whole runway construction with the trapping devices is attached to the cap, the bait may be inserted and then the cap attached by screw threading on the bottle or container.

My invention is illustrated in connection with the accompanying drawings, in which:

Fig. 1 is a vertical, longitudinal section taken on the line 1—1 of Fig. 2 in the direction of the arrows;

Fig. 2 is a front elevation taken in the direction of the arrow 2 of Fig. 1;

Fig. 3 is a section similar to Fig. 1 with portions of the trap in a different position;

Fig. 4 is an enlarged section of the lower end of the gate and the tilting runway in the position of Fig. 1;

Fig. 5 is a similar view with the same elements in the position of Fig. 3.

In my invention I employ a container 11 which is preferably a glass bottle with a large opening 12 or other suitable device, this having a screw threaded neck 13. A cap or cover designated generally at 14 has a disk 15 and a threaded flange 16 which engages with the threads on the bottle, securing the cap in position. The disk of the cap has a rectangular cutout opening 17.

To the margins of this opening there is secured a passageway structure 18. This has an inclined floor 19 with lateral extensions 20 at the bottom and a lower edge 21 to engage the ground or floor. There are opposite side walls 22 and an inclined top 23, the top being parallel to the floor 19. These elements are preferably secured to the disk 15 of the cover by having tongues 24 extending through slots in the disk, these being bent over on the inside.

A tiltable runway designated generally 25 is mounted on a pivot rod 26, which rod passes through openings in the side walls 22. This runway has an outer portion 27 and an inner portion 28, these being formed corrugated, as indicated at 29. Operating in the passage, there is a pivot gate 30, this being indicated as having slight projections 31 at the top, which extend outwardly through openings 32 in the side walls at the lower end of the inclined top 23. This gate has an opening 33 therethrough with prongs 34 projecting downwardly into this opening. The gate may tilt upwardly sufficiently to allow passage of an animal inwardly as indicated by the dotted lines in Fig. 1, but in the normal position occupies the full line position of Fig. 1.

The lower portion 27 of the runway 25 is provided with a pair of apertures 35 on opposite sides, there being an upturned abutment 36 adjacent each perforation, and these perforations accommodate the lower side portions 37 of the gate. In the normal position of the runway, as shown in Figs. 1 to 4, the lower portion of the gate bears against the abutment 36 and is free to tilt inwardly. However, when an animal goes up the passage, walking up the runway, as soon as his weight is placed on the inner portion 28, the runway tilts upwardly from the position of Fig. 1 to that of Fig. 3. On the entrance of the animal, the gate tilts from the position of Figs. 1 and 4 to the dotted line position of Fig. 1, allowing the free entrance of the animal. However, should it attempt to back out, the prongs will dig into it and prevent its retreat, and thus urge the animal to enter the container. When the lower portions 37 of the gate extend through the perforations 35, as shown in Figs. 3 and 5, the gate is locked from movement either upwardly or outwardly.

A bait hook 38 is provided, this being formed by cutting a slit 39 in the inclined top 23 of the passage and bending the metal cut inwardly. This, then, has a sharpened point 40 on which bait may be secured. The bait, therefore, is at the upper end of the passageway and in a position to be noticed by the animal and to attract such animal into the trap, and as the cap 14 and the complete passageway may be readily removed from the container, it will be seen that the trap is easily baited.

Various changes may be made in the details of construction without departing from the spirit or scope of the invention as defined by the appended claims.

I claim:

1. A trap having a container with an enclosed passageway having an inclined floor leading thereto, a pivotally mounted runway in one position being substantially parallel to the said floor, said runway having means to tilt same due to the weight of an animal moving through the passage, a pivotally mounted gate, means cooperating with said gate and the runway to limit the outward movement of the gate, the said gate swinging inwardly on the inward passage of an animal, and means on the runway when tilted to engage the gate when in its closed position.

2. A trap having a container with an enclosed passageway leading thereto, such passageway having an inclined floor, a runway pivoted intermediate its ends and having a first section which in its lowermost position is parallel to the floor, and having a second section extending partly into the container, a pivotally mounted gate in the passageway having means to engage an animal, an interacting means between the gate and the runway when in its lowermost position to prevent outward movement of the gate, the said gate being free to tilt inwardly for entrance of an animal, a second means interengaging between the gate and the runway to prevent movement of the gate in either direction when the runway is in its uppermost position.

3. A trap having a container with an enclosed passageway having an inclined floor, a pivotally mounted runway having a corrugated section which in its inoperative position is substantially parallel to the floor, a pivotally mounted gate having prongs to engage an animal, abutment lugs on the runway engaging the gate to prevent outward movement thereof, the said runway having perforations to engage the gate when said runway is in its uppermost position and thereby lock the gate from movement.

4. A trap having a passage with an inclined floor, a runway pivoted adjacent the upper end of the floor having a first section substantially parallel to the runway and a second section extending inwardly toward the container, said runway having projecting abutment lugs on opposite sides and apertures adjacent thereto, a gate pivotally mounted in the upper part of the passageway and having prongs to engage an animal and with side portions engaging the said abutments to prevent outward movement of the gate when the runway is in its lowermost position, the said runway when in its uppermost position engaging the said gate to lock same from movement.

5. A trap having a container with an enclosed passageway having a floor, a tiltable runway pivoted intermediate its ends and having its inner portion projecting into the container, a gate pivoted above the floor, means on the runway engaging the gate to prevent outward movement but allowing inward movement thereof.

6. A trap having a container with an enclosed passageway having a floor, a tiltable runway pivoted intermediate its ends and having its inner portion projecting into the container, a gate pivoted above the floor, means on the runway engaging the gate to prevent outward movement but allowing inward movement thereof, said runway being provided with means coacting with the gate to lock the gate against movement in either direction when the runway is tilted upwardly.

7. A trap having a container with an enclosed passageway having a floor, a tiltable runway pivoted intermediate its ends and having its inner portion projecting into the container, a gate having prongs to engage an animal, said gate being pivoted above the floor, abutment lugs on the runway engaging the gate to prevent outward movement but allowing inward movement thereof, said runway being provided with means coacting with the gate to lock the gate against movement in either direction when the runway is tilted upwardly.

In testimony whereof I have signed my name to this specification.

JOHN M. SCHILTZ.